March 7, 1967  R. B. MACIEJCZAK  3,307,714
MATERIAL HANDLING APPARATUS
Filed Feb. 23, 1965  4 Sheets-Sheet 1
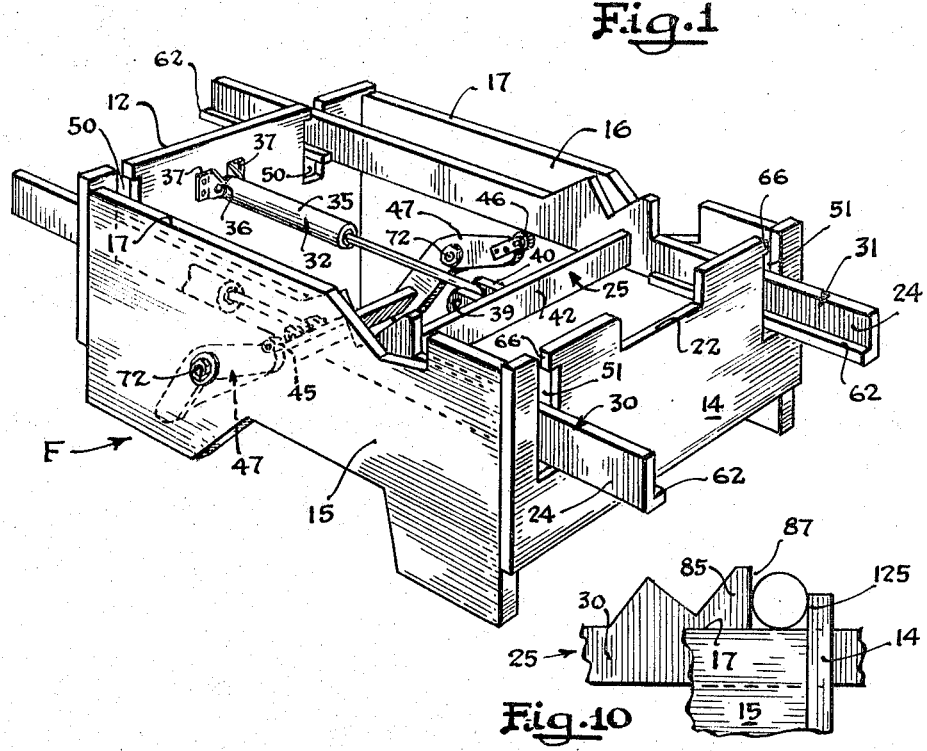
Fig.1
Fig.10
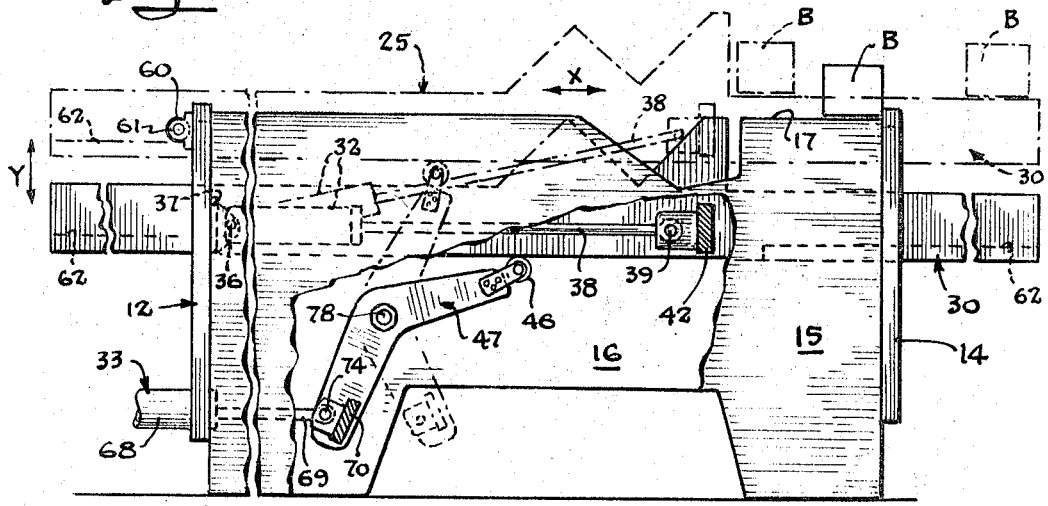
Fig.2
Inventor
Robert B. Maciejczak
By Wallace, Kinzer and Dorn
Attorneys

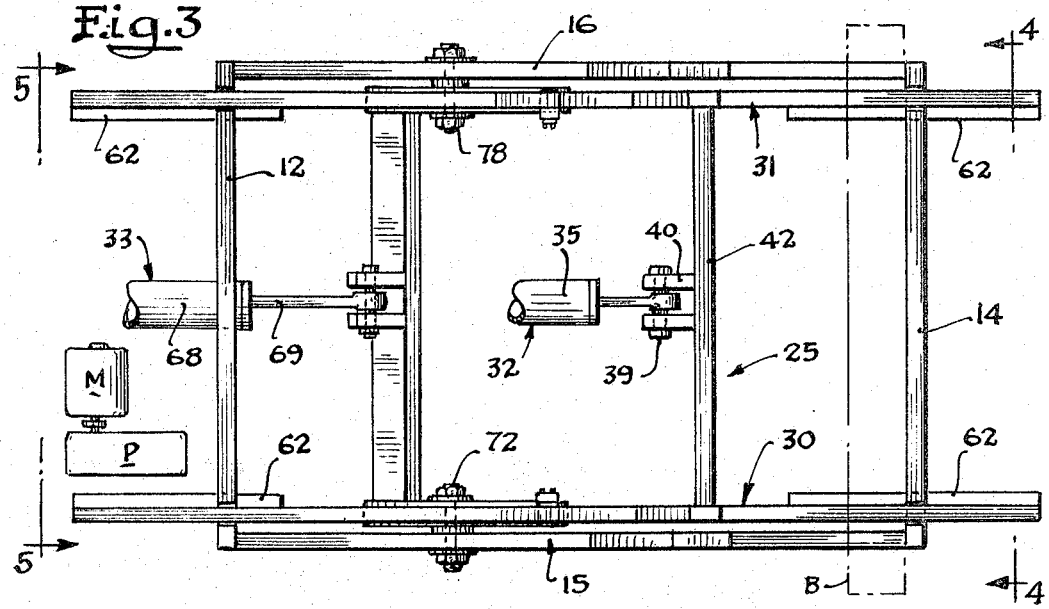
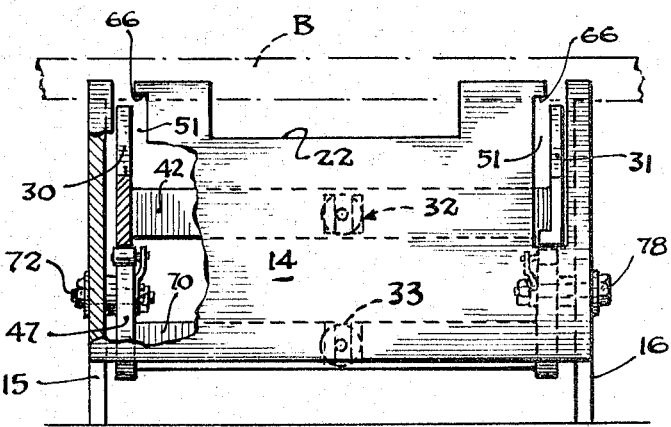

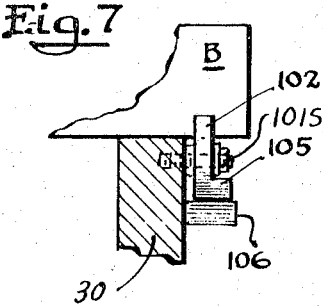
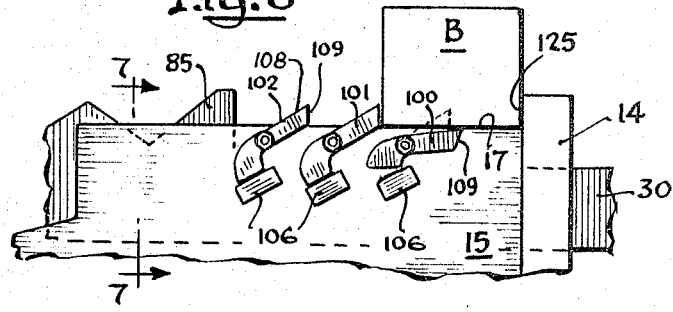
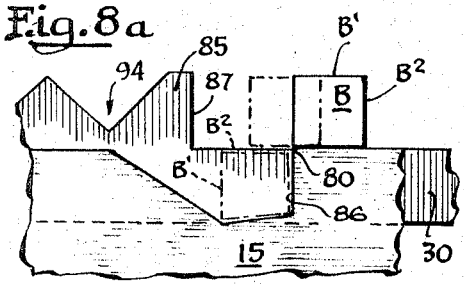
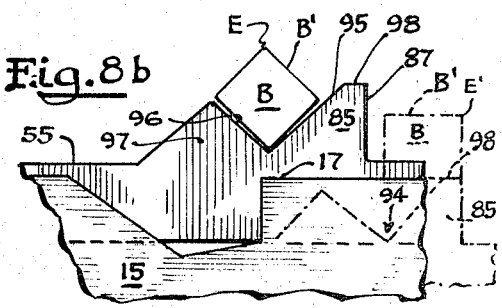
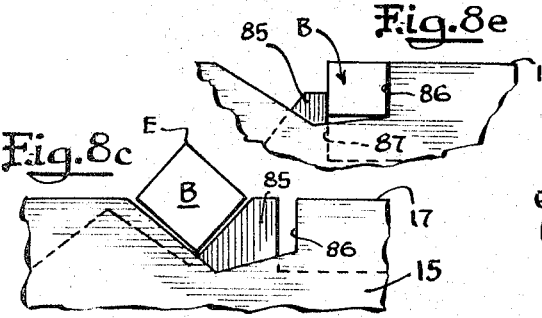
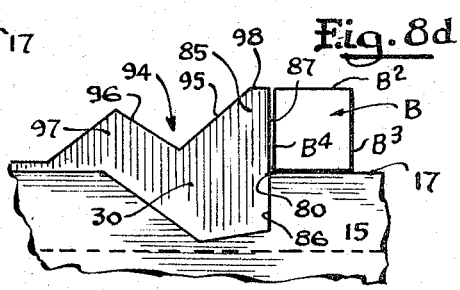
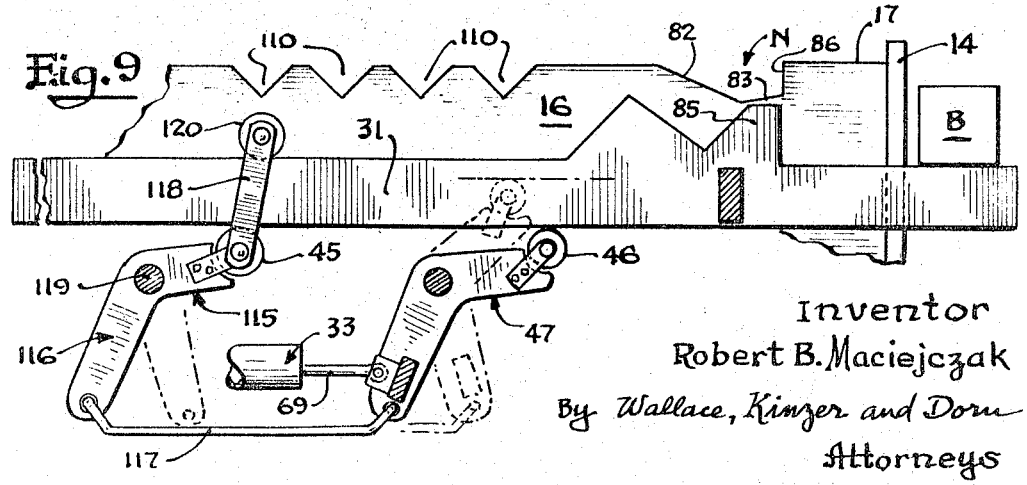

3,307,714
MATERIAL HANDLING APPARATUS
Robert B. Maciejczak, 2628 E. 93rd St.,
Chicago, Ill. 60642
Filed Feb. 23, 1965, Ser. No. 434,538
10 Claims. (Cl. 214—1)

This invention relates to a method of and an apparatus for handling or turning work pieces of various configurations such as slabs, billets, blooms or the like.

The present invention is directed to the problem of automatic handling of work pieces to expose the various sides thereof for inspection, machine operations, or other operations. One use, to which the present invention is particularly adapted, is that of turning heavy work pieces such as blooms or billets or slabs to expose surface defects for scarfing, chipping or grinding of seams, scabs, embedded slagment particles or the like. In some instances, it is desirable that a turning apparatus be capable of handling various sizes of work pieces and also work pieces of different configurations such as slabs or billets. Accordingly, an object of the present invention is the capability of turning billets or slabs with the same material handling device.

While it has been generally known to provide an automatic apparatus for turning billets having a generally square cross-section, it is unknown to the present inventor, except under the present invention, that large rectangular, block-shaped work pieces, i.e. slabs, may also be turned through successive angles of 90° to present the sides thereof to an operator for inspection and removing of surface defects as with the billets. Accodingly, a further object of the invention is a method of automatically turning slab shaped articles to eliminate manual operations heretofore involved in turning such slabs.

Some ingots are formed into generally circular section shafts or a many sided bar as an eight sided or octagon shaped bar. With circular or many sided bars, it is desirable to clamp or hold the bar in a fixed position during a scarfing, chipping or grinding operation; and accordingly another object of the invention is the capability of clamping a bar, shaft or slab in a position to prevent the turning thereof in a turning apparatus while an operation is being performed on the bar, shaft or slab.

Also with large rectangular shaped slabs it is desirable to present small sides thereof in a generally upper position for a cleaning or inspection operation. Under the present invention and as a further object thereof, the slab may be resting on a small side wall thereof and held clamped in this position to render the slab more stable during cleaning or inspection of its opposite small side wall. Another object of the invention is the ability to handle various sizes of billets or blooms or slabs in a material turning device. More specifically, under this object of the invention, the material handling device has a carriage provided with a number of selectively useable dogs which are especially suited for different sizes of slabs or billets.

Another object is a new and improved method of automatically turning heavy slabs to present the various sides thereof to an uppermost position.

Other and further objects of the present invention will be apparent from the following description and claims and are illustrated in the accompanying drawings which, by way of illustration, shows preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a perspective view of a material handling apparatus constructed in accordance with the principles of the present invention;

FIG. 2 is a side elevational view of the material handling apparatus of FIG. 1;

FIG. 3 is a plan view of the material handling apparatus;

FIG. 4 is an end view taken along the line 4—4 of FIG. 3 in the direction of the arrows showing the discharge end of the material handling device;

FIG. 5 is an end view taken along the line 5—5 of FIG. 3 in the direction of the arrows showing the front end of the material handling apparatus;

FIG. 7 is a sectional view taken along the line 7—7 of FIG. 8 in the direction of the arrows and showing a pivotally mounted dog;

FIG. 8 is a side view of a positioning arm having a plurality of pivotally mounted dogs thereon;

FIGS. 8a–8e show a diagrammatic illustration of a number of positions to which a billet may be positioned;

FIG. 9 is another embodiment of the invention having a pair of levers for maintaining the positioning arms in the generally horizontal position; and FIG. 10 illustrates the clamping of a circular sectioned shaft.

Figure 6A:
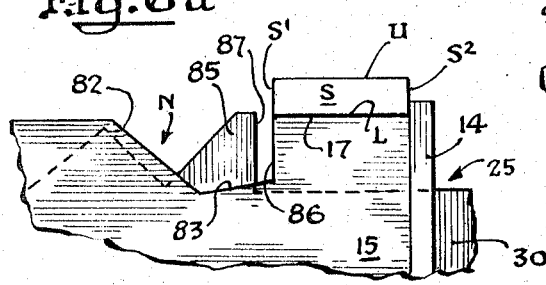
FIGS. 6a–6g illustrate diagrammatic positions for turning a slab in accordance with the invention.

Referring now to the drawings and more particularly to the perspective view of FIG. 1 there is illustrated a material handling device 10 particularly adapted for turning relatively heavy billets, blooms or slabs to bring the perspective sides thereof into a position for inspection or cleaning operations. The material handling device has a frame F which includes a generally rectangular framework having a front plate 12, a back plate 13, and a pair of side plates 15 and 16. The upper edges 17 of the respective side plates 15 and 16 constitute a supporting means for holding the work piece such as the billet B, FIG. 2, which may be placed thereon by a fork lift truck or a crane mechanism. The work pieces such as slabs, blooms, billets, shafts or the like, are usually of such heavy weight that they can not be readily handled by an operator without the aid of a mechanical device. To facilitate the placing of the billet B interiorly of the frame F by a lift truck, the back plate 14 has an upper, generally U-shaped opening 22, FIG. 1, through which the usual forks of the lift truck may be withdrawn.

Alternatively, as seen in FIGS. 1 and 2, the work piece such as the billet B may be placed on the forward ends 24 of a transporting means or carriage means 25 outside of the frame F. The carriage 25 includes a pair of work positioning arms 30 and 31 adapted to be moved horizontally by a motor means 32 and to be moved vertically by a lifting motor means 33. That is, the carriage means 25 is moved in a generally horizontal direction, indicated by the arrow X in FIG. 2, by the motor means 32, and the carriage means 25 is moved in the vertical direction indicated by the directional arrow Y between the solid line position and the phantom line position of FIG. 2.

The moving motor means 32 includes a cylinder 35 pivotally connected at its forward end by a pivot pin 36, FIG. 2, to a bracket 37, secured to the front plate 12. The motor means 32 has a piston rod 38 extending from the cylinder 35 and connected at its opposite end by a pivot pin 39 to a bracket 40 on a cross-arm 42 extending transversely between said position arms 30 and 31 of the carriage means 25.

The moving motor means 32 is preferably a hydraulic cylinder of the double acting type in which the direction of force of the pressurized fluid on an internal piston determines that the piston rod 38 mores inwardly or outwardly of the cylinder 32 to afford the horizontal movement of the carriage 25. The length of the cylinder and also the amount of stroke or piston travel may be in practice, increased considerably from that illustrated in FIG. 2.

The carriage 25, is supported for movement across the spaced rollers 45 and 46 on a pair of opposite bell crank levers 47. The arms 30 and 31 of the carriage 25 are maintained in the generally aligned relationship against tilting about a longitudinal axis of the frame F by guiding ways or slots 50 formed in the front plate 12 and by guiding ways 51 formed in the rear plate through which project the rearward ends 24 and the rearward ends 53 of the arms 30 and 31. The guideway slots 50 and 51 preferably are opened at the top portions thereof so as to permit upper edges of surfaces 55 of the arms 30 and 31 to move upwardly above the supporting surfaces 17 of side plates 15 and 16 of the frame F.

For the purpose of guiding movement of the arms 30 and 31 while in their upper positions, guide rollers 60, FIG. 2, are secured by brackets 61 for engagement with wear plates 62 secured on the inboard sides of the respective portions 53 of the arms 30 and 31. The wear plates 62 are of sufficient length to be in engagement with the rollers 60 throughout the entire horizontal movement of the carriage 25. If desired, similar guide rollers could be provided on the back plate 14 in cooperation with the wear plates 62 at the rearward portions of the arms 30 and 31. However, the weight of the work piece on the forward portions of the positioned arms 30 and 31 prevents excessive wear between the top surfaces of the wear plates 62 and shoulders 66, FIG. 1, formed near the top of grooves 51 in the rear plate 14.

The arms 30 and 31 are moved vertically by the lifting motor 33 which is secured to the front plate 12 at the lower portion thereof, as seen in FIGS. 2 and 5. The lifting motor 33 includes a cylinder 68 and a piston rod 69 which is pivotally connected to a cross bar 70 secured to the lower ends 72 of the bell crank levers 47. A bracket 74 secured to the cross arm 70 has a pin for pivotally connecting the piston rod 69 to the cross bar 70. Thus, it will be seen that the application of fluid under pressure to the lifting cylinder 68 causes its piston rod 69 to reciprocate and thereby pivot the bell cranks 47 to raise or lower the arms 30 and 31 supported on the rollers 45 and 46 on the respective bell cranks 47. The bell cranks 47 are pivotally mounted on stub shafts 78 secured to the respective side walls 15 and 16 of the frame F.

A suitable motor M and pump P for the hydraulic fluid, FIGS. 3 and 5, are provided to supply sufficient hydraulic fluid under pressure to cause the double acting motor means 32 and 33 to move the work piece vertically, horizontally or simultaneously both horizontally and vertically. In the interest of simplicity neither the hydraulic controls nor the conventional observation platform, on which said such controls may be located, are illustrated. Such controls and platform are disclosed in U.S. Patent No. 3,042,226, issued July 3, 1962, to R. B. Maciejczak, which is incorporated herein by reference. It is to be understood that the same or another type of platform is preferably provided for the operator above the frame F for the material handling apparatus 10 disclosed herein.

Referring now to FIGS. 6a–6g, there is illustrated in sequential operation the manner of handling slab shaped articles having an upper surface U, a lower surface L, and side surfaces $S^1$ and $S^2$, each of which surfaces is desired to be inspected for defects which may be scarfed, ground or chipped. In FIG. 6a, a work piece in the form of a slab S is shown with its lower surface L supported by the supporting surfaces 17 of the respective side frames 15 and 16. It will be noted that the carriage 25 is positioned with its supporting and upper surfaces 55 disposed vertically beneath the upper surfaces 17. However, in FIG. 6b, the lifting motor means 33 has moved the carriage 25 upwardly to lift the slab S from the supporting surfaces 17 and frame F and the moving motor 32 has been operated by hydraulic fluid to pull the carriage 25 leftwardly to the position of FIG. 6.

For the purpose of turning the slab for working on another surface of the slab S other than the upper surface U, the slab S is moved by the carriage 25 to a position over corners of notches N, which corners function as turning lands 80. That is, in this embodiment of the invention, the rearward and upper corners 80 of notches N formed in the respective side plates 15 and 16 constitute the means for turning of a slab, billet or the like. When the center of gravity for the slab S is forwardly moved past turning land 80 (leftwardly in FIGS. 6b and 6c), and the carriage 25 is lowered, the slab S engages the turning land 80 and under gravity tilts side edge $S^1$ downwardly to engage a corner $C^1$ with a slanting support surface 82. In this position, the surface U is still generally uppermost.

To move the side $S^2$ into an upright position for inspection and/or cleaning operations, a force is exerted on the corner $C^2$ of the slab S by a dog 85 on the respective positioning arms 30 and 31. The dog 85 has a vertical surface 87 which engages the corner $C^2$ of the slab S and forces the corner $C^1$ of the slab S downwardly along the inclined surface 82. When the intersecting and reversely inclined surfaces 83 in the bottom of the notches N are reached, the corner $C^1$ is forced up the inclined surface 83 until reaching a vertical stop surface 86 forming a rearward wall for the notch N. Further force on the surface U moves the surface L flush against the stop surface 86. Thus, the slab S has now been rotated through 90 degrees so that the surface $S^2$ is now uppermost for inspection and/or cleaning. It should be noted that the slab S is held in this lesser stable position, as contrasted with position of slab in FIG. 6a, by a clamping force exerted by the dog 85 against the vertical stop surface 86 of the notch N on the respective side plates 15 and 16.

Figure 6B:
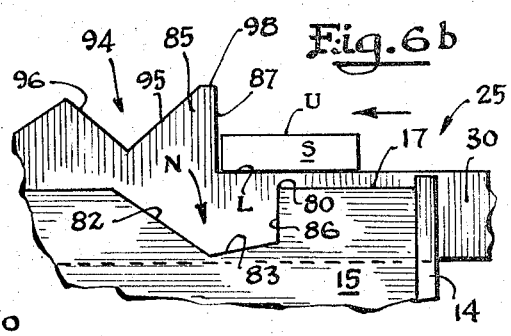
Figure 6C:
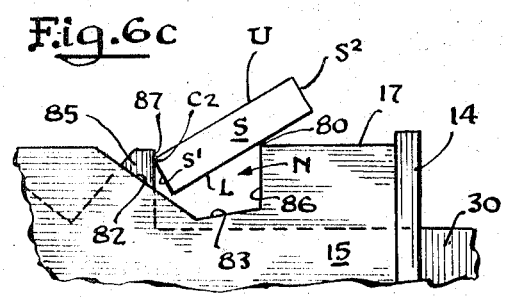
Figure 6D:
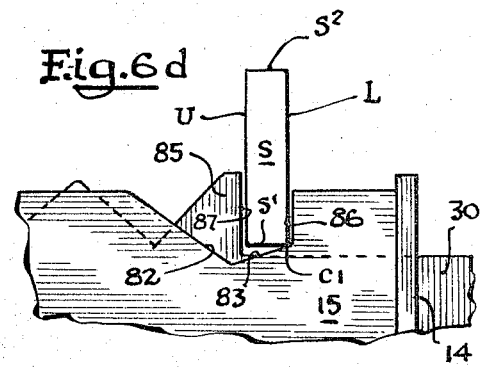
Figure 6E:
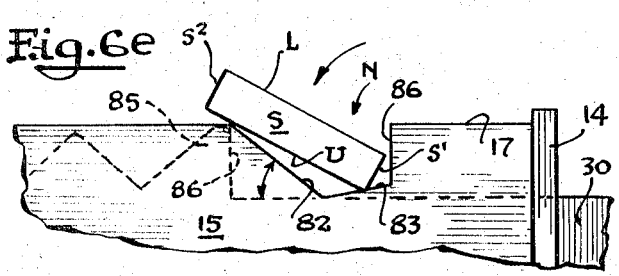

For the purpose of turning the slab S through another 90 degrees of movement, the dog 85 is moved leftwardly from the position of FIG. 6d, to that of FIG. 6e, so that the slab S turns to the canted position of FIG. 6e, wherein the former upper surface U is now disposed generally downward with the surface L disposed generally upward. The slab S is thus resting at its upper ends 86 on the top of the inclined surface 82 with the bottom portion of the slab S resting on the inclined surface 83. The slab S partook of turning movement in the counterclockwise direction from the position shown in FIG. 6d, to the position of FIG. 6e, because the slab S was supported only adjacent the corner $C^1$ with the center of gravity for the slab S disposed leftwardly of the corner $C^1$. Thus, when the dog 85 was moved leftwardly, the slab S turned in a counterclockwise direction about its lower corner $C^1$.

To move the side L of the slab S into a generally horizontal position, the carriage 25 moves upwardly to lift the slab S upwardly from the notch N and above the side plates 15 and 16. The side L of the slab S may now be inspected or cleaned. Alternatively, the slab S may be moved and deposited on the supporting surfaces 17 of the side plates 15 and 16. To bring the surface S¹ to the upper inspection and cleaning position, the slab S is moved over the turning land 80 and tilted to a position similar to that of FIG. 6c, except that surfaces U and L are reversed. Turning of the slab S further counterclockwise by the dog 85 into the position shown in FIG. 6d brings the slab S into the vertical position of FIG. 6d, except that the sides S¹ and S² are now reversed.

Figure 6G:
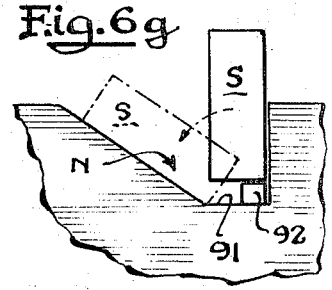
Figure 6F:
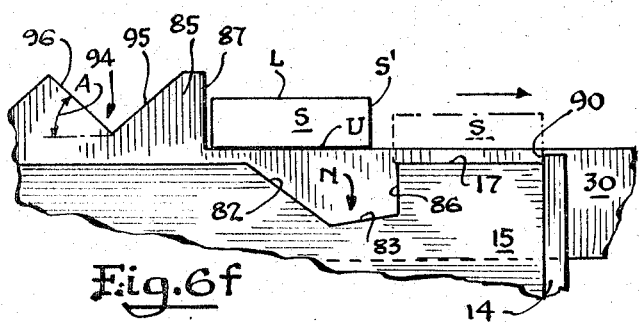

Another embodiment of the invention is shown in FIG. 6g. In this embodiment of the invention, the inclined surface 83, described in FIGS. 6a–6f, has been replaced by a flat surface 91 on which is secured a small piece of metal which functions as a turning land 92. It is apparent from FIG. 6g, that the land 92 is effective to support one of the smaller sides S¹ or S² of the slab S when the slab S is upright and to support the slab S offset from the center of gravity so that the slab S will rotate in a counterclockwise direction when the clamping force provided by the dog 85 is removed.

An important aspect of the present invention is the ability not only to handle slab shaped articles, but also billets B which may be of varied cross-sections such as the square cross-sections, FIGS. 8a–8d, generally circular cross-section or a many faceted section. One manner of turning billets B under the principles of the present invention is described hereinafter in conjunction with FIGS. 8a–8d. A billet B on the carriage 25 is transported over the turning land 80 so that the center of gravity of the billet B is disposed forwardly of the stop surface 86 of the notch N whereby upon lowering the carriage 25 the billet B rotates in a counterclockwise direction to move the surface B¹ from the upper, horizontal position to a vertical position and to move the surface B² from a vertical position to an upper position. Thus, the billet B is rotated through 90 degrees from the solid line to the phantom line position in FIG. 8a. The billet B can be held in this position during an inspection or scarfing operation by moving the dog 85 into clamping relationship with the side B¹ of the billet or the billet B can be lifted upwardly and placed on the supporting surface 17, as seen in FIG. 8d. To move the surface B³ into the upper working position, the billet B is moved from the position of FIG. 8d leftwardly to bring the center of gravity of the billet B forwardly past the turning land 80. Whereupon lowering of the carriage 25 causes the turning land 80 to engage the undersurface of the billet B which turns into the notch N and thereby through another 90 degrees.

In addition to scarfing the sides B¹, B², B³ or B⁴, of a billet B is often desired to have the corner edges E of a billet disposed uppermost for ready inspection and cleaning operations. For this purpose, it is preferred that the arms 30 and 31 be provided with a billet receiving notch 94, FIG. 8b, formed by an inclined surface 95 on the reverse side of the pushing dog 85 and an intersecting, reversely inclined surface 96. The inclined surface 96 is on an upstanding projection 97 standing above the plane of the supporting surfaces 55 on the position arms 30 and 31.

Preferably, the surface 96 is inclined at an angle A FIG. 6b, which is less than 45 degrees. Thus, when the positioning arms 30 and 31 have a billet B on edge in their notches 94, and the arms 30 and 31 are moved downwardly to deposit the billet B on the supporting surfaces 17 of the side frames 15 and 16, the billet B rotates about its axis in a counterclockwise direction to deposit the billet B with the surface B¹ in the upper position as shown by dotted lines in FIG. 8b. If it is desired to move the next edge E¹ into the uppermost position, the arms 30 and 31 are moved downwardly to their lower position and are moved horizontal to bring the top surfaces 98 of the pusher lugs 85 under the rearward ends of the billet B. Then, upward movement of the carriage 25 engages the surfaces 98 of the pusher lugs 85 with the rearward edges of the billet B and the upper surfaces 98 function as a turning land to rotate the billet B in a counterclockwise direction into the receiving slot 94 with the edges E¹ uppermost, as will be apparent from what is shown in FIG. 8b. That is, the surface 98 engages the bloom B in FIG. 8b to the right of its center of gravity and consequently as the surface 98 continues upwardly it exerts a force on the billet B to rotate the billet B about its axis the billet B slides down the inclined surface 95 and into the notch 94 as the arms 30 and 31 continue upwardly.

From the foregoing, it will be seen that this action may be repeated to bring the other corners of the bloom B into an inspection position with each 90 degree turn of the bloom B after each of the subsequent series of operations as immediately described above.

In the embodiment of the invention illustrated in FIG. 8, a series of pivotally mounted dogs 100, 101 and 102, are provided on the position arms 30 and 31 for facilitating the handling of different sizes of blooms, slabs or the like. The dogs 100–102 are each pivotally mounted on support shafts 101S secured by threads in the arms 30 and 31, as seen in FIG. 7. The pivotally mounted dogs 100, 101 and 102, each have a weighted portion 105 which biases its respective dog in a counterclockwise direction until limited by its associated stop member 106 also secured to the respective position arms 30 and 31. When the weighted portions 105 are in engagement with the associated stop members 106, upper ends 108 on the respective dogs 100, 101 and 102 are disposed above the supporting surfaces 55 of the respective support arms 30 and 31 for positioning or clamping engagement with a billet B or a slab S. Preferably, the ends 108 terminate in surfaces 109 which are disposed vertically when the associated weighted portion 105 is resting on the stop block 106. As seen in FIG. 8, the billet B is of sufficient width and also positioned on the arms 30 and 31 so as to pivot dog 100 downwardly from the dotted line position to the solid line position shown in this figure thereby rendering the dog 101 effective to provide the positioning or clamping force for a billet against the back plate 14. The dogs 100, 101 and 102, enable the clamping and turning of slabs S or billets B with less horizontal sliding movement of the carriage 25.

In the embodiment of the invention illustrated in FIG. 9, the side plates 15 and 16 have additional troughs 110 provided for turning of billets by the forward portions carriage 25 in accordance with the disclosure and in the manner set forth in the aforementioned U.S. Patent No. 3,042,226.

If it is desired to insure a more parallel lifting of the supporting arms 30 and 31, particularly when a heavy billet B is disposed on the rearward ends 24 of the arms 30 and 31, and additional set of lifting bell cranks 115, FIG. 9, may be employed at a spaced distance from the bell cranks 47 to provide spaced points for applying the lifting forces. The bell cranks 47, FIG. 9, may be provided with links 117 connected to the lower ends of the respective bell cranks 116 to afford an equal amount of pivotal movement to the bell cranks 47 and 116. Also to hold the arms 30 and 31 against upward or counterclockwise rotation because of the heavy weight in the notch N or on the rearward portions 24 of the carriage 25, the arms 30 and 31 may be held downwardly against rollers 45 on the bell cranks 116 by an arm 118 secured to the pivot shaft 119 for the bell cranks 116. Preferably, the arm 118 has a roller 120 for rolling engagement along the top surface of each of the respective position arms 30 and 31. Thus, in this manner means may be provided for maintaining the parallel relationship to the position arms 30 and 31. Other equivalent means such as weights or the like could also be afforded on the position arms 30 and 31 as a counter weights for the billet B or the like disposed on the rearward portions of the arms.

For the purpose of holding shafts or other more readily turnable objects in a fixed position against turning, the clamping dog 85 is adapted to be moved across the top surfaces 17, to exert a clamping force on the shaft, FIG. 10, which is abutted against the top portion 125 of the back plate 14. The clamping of a shaft or other type of billet or bloom by the dog 85 on the carriage 25 against the portion 125 provides assurance that the work piece will not turn therein a grinding or scarfing operation. As hereinbefore described, the vertical surface 86 in the notch N likewise, serves as a stop means, as does the top portion 125, for holding a shaft or bloom by clamping pressure exerted by the dog 85.

From the foregoing, it will be seen that the present invention affords a novel method and apparatus for turning slabs, billets, round shafts or the like. Also the present invention provides for clamping a work piece such as the bloom, billet or slab in a given position while work is being performed thereon thereby eliminating the tendency of the work piece to turn. The present invention is thus adapted for turning various shapes, forms and sizes of work pieces which may be termed billets, slabs, shafts, or the like.

Hence, while preferred embodiments of the invention have been described and illustrated, it is to be understood that they are capable of variation and modification.

I claim:

1. A method of turning a generally rectangularly sectioned body having a pair of end surfaces and a pair of side surfaces, said method comprising the steps of: positioning the bottom one of said side surfaces on a turning land with the center of gravity disposed over a generally open space permitting said unsupported portion of said body to turn to a generally canted position downward into said open surface, applying a force to the lower end of the body to move the lower end of the body toward the turning land and to move the body into a generally upright position on the lower one of said side surfaces, supporting said lower end surface adjacent one edge portion thereof only while leaving unsupported the remaining portion of the lower end surface of the body in the open space, removing the force holding said body upright to permit the body to turn about its supported lower end portion end to rotate said body about the supported edge portion bringing the previous upperside toward a downward position.

2. In a material handling apparatus for turning a rectangular sectioned, slab-like workpiece, supporting means for supporting said workpiece on one of two flat sides thereof, turning land means on said supporting means for causing said slab to rotate to a canted position, means for moving said workpiece across said support means and over said turning land means, inclined supporting surface means for engaging a side surface of said rectangular workpiece in its canted position, positioning force means for moving said rectangular workpiece from said inclined supporting surface to an upright position with said flat sides being disposed in a generally vertical relationship, means for supporting a corner of said workpiece forwardly of the axis thereof when said workpiece is in its generally upright position, removal of said positioning force allowing said workpiece to be rotated rearwardly and to reverse positions of said sides of said workpiece.

3. The apparatus of claim 2 wherein said means for supporting a corner of said workpiece is an inclined surface inclined reversely to the incline of said supporting surface.

4. In a material handling apparatus for turning a slab-like workpiece, supporting means for supporting said workpiece on one of two flat sides thereof, turning land means on said supporting means for causing said slab to rotate a generally canted position, carriage means for lifting said workpiece and for transporting said workpieces across said support means and over said turning land means, means presenting an inclined supporting surface for supporting a lower edge portion an edge of said rectangular workpiece in its canted position, means on said carriage to engage said workpiece and force its lower supported edge to turn said workpiece into an upright position with said flat sides of said workpiece being disposed in a generally vertical relationship, means for supporting an edge of said workpiece forwardly of the axis thereof when said workpiece is in its generally upright position, movement of said carriage to remove said means thereon from engagement with said workpiece allowing said workpiece to be rotated rearwardly.

5. The material handling apparatus of claim 4 including a plurality of spaced turning notches formed on said supporting means and land means for turning billets through a series of on-edge positions.

6. In a material handling apparatus for turning workpiece having a width in excess of its thickness, said workpiece having a pair of larger opposed sides, supporting means for supporting such a workpiece on one of said larger sides thereof, a turning notch means on said supporting means having a turning corner for engaging said one larger side to allow said workpiece to rotate into said notch at an oblique angle, carriage means for moving said workpiece across said support means and over said turning corner, surface means in said notch means for supporting said workpiece in its oblique position, means for exerting a force on said portion of said workpiece in said notch means to turn said workpiece further about said turning corner to cause said workpiece to remove said one larger surface from said corner and toward the uppermost position, said carriage means being movable to lift said workpiece upwardly to complete said turning of said workpiece.

7. In a material handling apparatus for turning an article such as a slab, billet or like workpiece, spaced supporting means having supporting surfaces for supporting said workpiece on a first side thereof; a carriage means for engaging the underside of said workpiece and for lifting said workpiece from said supporting surface; means for moving said carriage transversely of said supporting means; and notch means formed in each of said supporting surfaces, said notch means including a vertical side, and a first inclined surface leading to said vertical side, a reversely inclined surface leading to said first inclined surface.

8. In a material handling apparatus for turning an article such as a slab, billet or like workpiece, spaced supporting means having supporting surfaces for supporting said workpiece on a first side thereof; a carriage means for engaging the underside of said workpiece and for lifting said workpiece from said supporting surface; means for moving said carriage transversely of said supporting means; and notch means formed in each of said supporting surfaces, said notch means including a vertical side, a first inclined surface leading to said vertical side, a reversely inclined surface leading to said first inclined surface, and pusher means on said carriage for engaging said workpiece and for pushing said workpiece in a transverse direction.

9. The material handling device of claim 8 wherein said pusher means is an upstanding lug and wherein said carriage has a notched surface holding a workpiece with an edge thereof in the uppermost position.

10. In a material handling apparatus for turning a slab or like workpiece, support means presenting a support surface for one side of the workpiece and having an opening therein presenting a vertical stop surface against which one side of the workpiece is to be brought into engagement, the support surface and the stop surface meeting at a turning land, means for moving the workpiece off the support surface and allowing it to drop into the opening while said side thereof is engaged with said turning land, said opening terminating at an inclined surface engageable by the bottom of the workpiece and on which the workpiece when unsupported in said opening will tilt in a direction away from said side, clamping means for moving against the opposite side of the workpiece dropped into said opening to force said workpiece to an upright position with said one side against said stop surface while an edge portion only at the bottom of the workpiece is engaged with said inclined surface while the remaining bottom portion of the workpiece is unsupported on said inclined surface, and means to withdraw the clamping means causing the workpiece to so tilt within said opening.

References Cited by the Examiner

UNITED STATES PATENTS

| | | | |
|---|---|---|---|
| 3,117,680 | 1/1964 | Mrowinski | 214—1 |
| 3,182,815 | 5/1965 | DiLella et al. | 214—1 |
| 3,182,817 | 5/1965 | Figley | 214—1 |
| 3,193,114 | 7/1965 | Schaar | 214—1 |

MARVIN A. CHAMPION, *Primary Examiner.*